United States Patent
Black et al.

(10) Patent No.: US 6,735,585 B1
(45) Date of Patent: May 11, 2004

(54) METHOD FOR SEARCH ENGINE GENERATING SUPPLEMENTED SEARCH NOT INCLUDED IN CONVENTIONAL SEARCH RESULT IDENTIFYING ENTITY DATA RELATED TO PORTION OF LOCATED WEB PAGE

(75) Inventors: Jeffery Dean Black, Laural, MD (US); Jason Harvey Titus, Alexandria, VA (US); Ira Joseph Woodhead, Alexandria, VA (US)

(73) Assignee: AltaVista Company, Palo Alto, CA (US)

( * ) Notice: Subject to any disclaimer, the term of this patent is extended or adjusted under 35 U.S.C. 154(b) by 0 days.

(21) Appl. No.: 09/373,324

(22) Filed: Aug. 12, 1999

Related U.S. Application Data

(60) Provisional application No. 60/097,029, filed on Aug. 17, 1998.

(51) Int. Cl.⁷ .............................................. G06F 17/30
(52) U.S. Cl. ..................... 707/3; 707/2; 707/4; 707/5; 707/10; 707/102; 709/219; 709/224; 715/501; 715/512; 715/513
(58) Field of Search ................... 707/1–10, 100–104.1, 707/501, 512–513, 501.1, 522; 709/203, 224, 218–219, 217, 226, 225, 238, 244; 705/26–27; 379/15.05, 259, 14.01, 111, 114.28–114.29, 115.01–115.02

(56) References Cited

U.S. PATENT DOCUMENTS

| | | | |
|---|---|---|---|
| 5,761,662 A | * | 6/1998 | Dasan ........................... 707/10 |
| 5,768,578 A | * | 6/1998 | Kirk et al. .................... 707/100 |
| 5,855,020 A | * | 12/1998 | Kirsch .......................... 707/10 |
| 5,905,862 A | * | 5/1999 | Hoekstra ...................... 709/202 |
| 5,930,474 A | * | 7/1999 | Dunworth et al. ........... 709/217 |
| 5,956,391 A | * | 9/1999 | Melen et al. .......... 379/114.01 |
| 5,974,455 A | | 10/1999 | Monier |
| 6,012,066 A | * | 1/2000 | Discount et al. ........ 707/103 R |
| 6,037,934 A | | 3/2000 | Himmel et al. |
| 6,085,229 A | | 7/2000 | Newman et al. |
| 6,101,537 A | * | 8/2000 | Edelstein et al. ........... 709/219 |
| 6,119,135 A | | 9/2000 | Helfman |
| 6,141,759 A | | 10/2000 | Braddy |
| 6,148,289 A | * | 11/2000 | Virdy ............................. 705/1 |
| 6,151,624 A | * | 11/2000 | Teare et al. ................. 709/217 |
| 6,167,453 A | * | 12/2000 | Becker et al. ............... 709/245 |
| 6,178,419 B1 | * | 1/2001 | Legh-Smith et al. .......... 707/6 |
| 6,195,657 B1 | | 2/2001 | Rucker et al. |

(List continued on next page.)

FOREIGN PATENT DOCUMENTS

| | | | | |
|---|---|---|---|---|
| WO | WO 97/15018 | | 4/1997 | |
| WO | WO 97/29414 | | 8/1997 | |
| WO | PCT/US99/18644 | | 1/2000 | |
| WO | PCT/US99/18645 | | 1/2000 | |
| WO | PCT/US99/18646 | | 1/2000 | |
| WO | WO-00/26762 | * | 5/2000 | |
| WO | WO 02/19172 | * | 3/2002 | ..................... 17/30 |

OTHER PUBLICATIONS

PCT International Search Report Corresponding To PCT International Application No. PCT/US99/18643; Authorized Officer: R. Katerbau; Date of Completion: Dec. 20, 1999; Date of Mailing: Jan. 11, 2000 (3 pages).

*Primary Examiner*—Srirama Channavajjala
(74) *Attorney, Agent, or Firm*—Brown Raysman Millstein Felder Steiner

(57) ABSTRACT

It is determined that an entity is registered as having control over the use of at least a portion of a World-Wide Web address for a first set of computer data that is accessible in accordance with Internet protocols. Enhanced search results are acquired that include a second set of computer data. The second set of computer data includes or links to information pertaining to the entity, other than information provided at the Web address.

26 Claims, 13 Drawing Sheets

U.S. PATENT DOCUMENTS

| | | | |
|---|---|---|---|
| 6,209,036 B1 * | 3/2001 | Aldred et al. ................ | 709/229 |
| 6,212,522 B1 | 4/2001 | Himmel et al. | |
| 6,243,750 B1 * | 6/2001 | Verma ........................ | 709/224 |
| 6,282,548 B1 * | 8/2001 | Burner et al. ............ | 707/104.1 |
| 6,349,295 B1 * | 2/2002 | Tedesco et al. ................. | 707/3 |
| 6,356,894 B2 * | 3/2002 | Nosohara ....................... | 707/3 |
| 6,393,407 B1 * | 5/2002 | Middleton et al. ............ | 705/14 |
| 6,401,118 B1 * | 6/2002 | Thomas ....................... | 709/224 |
| 6,412,003 B1 * | 6/2002 | Melen ........................ | 709/225 |
| 6,480,835 B1 * | 11/2002 | Light ............................ | 707/3 |
| 6,480,853 B1 * | 11/2002 | Jain ............................ | 707/10 |
| 6,516,312 B1 * | 2/2003 | Kraft et al. .................... | 707/3 |

\* cited by examiner

15 TOTAL HITS
RESULTS 1-10. PREVIOUS NEXT

1. UNIVERSITY OF MASSACHUSETTS MEDICAL SCHOOL
SCORE: 99%
NEWS RELEASE ARCHIVES UNIVERSITY OF MASSACHUSETTS MEDICAL SCHOOL 55 LAKE AVENUE
NORTH,=RIGHT> WORCESTER, MA 01655 (508) 856-0011 STAFF, FACULTY AND STUDENT DIRECTORY
DIRECTIONS TO UMASS MEDICAL SCHOOL NEW LINKS THE MISSION OF THE UNIVERSITY OF...

44a {
WHOIS | 411 | SEARCH BY: COMPANY, PARENT, INDUSTRY | SITE MAP | NEWS | JOBS | TRADEMARKS | } 46a
BUSINESS REPORT | EDGAR REPORTS

2. TABLE OF CONTENTS
SCORE: 95%
POLICIES THE UNIVERSITY OF MASSACHUSETTS THESE POLICIES ARE SUBJECT TO REVISION
AND SUBSEQUENT APPROVALS. CONTACT THE OFFICE OF RESEARCH WITH YOUR CONCERNS. CONFLICTS OF
INTEREST RELATING TO INTELLECTUAL PROPERTY AND COMMERCIAL VENTURES CONFLICT OF.

44b {
WHOIS | 411 | SEARCH BY: COMPANY, PARENT, INDUSTRY | SITE MAP | NEWS | JOBS | TRADEMARKS | } 46b
BUSINESS REPORT | EDGAR REPORTS

3. RESEARCH SERVICES RESEARCH SUPPORT UMMS 96 COMMERCIAL VENTURE...
SCORE: 94%
RESEARH SUPPORT SERVICES UMMS 96 COMMERCIAL VENTURES AND INTELLECTUAL
PROPERTY CONTACT: JOSEPH F.X. McGUIRL, EXECUTIVE DIRECTOR WILLIAM S. ROSENBERG,
44c { Ph. D., DIRECTOR OF LICENSING & VENTURES MICHAEL W. HENRY, DIRECTOR OF LICENSING &
VENTURES...

WHOIS | 411 | SEARCH BY: COMPANY, PARENT, INDUSTRY | SITE MAP | NEWS | JOBS | TRADEMARKS | } 46c
BUSINESS REPORT | EDGAR REPORTS

42

4. PARTICIPATION AGREEMENT FORM
SCORE: 94%
EXHIBIT A PARTICIPATION AGREEMENT THE UNIVERSITY OF MASSACHUSETTS TO DOWNLOAD THE OFFICIAL VERSION OF THIS FORM IN MS WORD FORMAT, SELECT THIS LINK. YOU CAN THEN VIEW AND PRINT IT USING EITHER YOUR COPY OF MICROSOFT WORD OR THE FREEWARE MICROSOFT....

WHOIS | 411 | SEARCH BY: COMPANY, PARENT, INDUSTRY | SITE MAP | NEWS | JOBS | TRADEMARKS | 46d
BISOMESS REPORT | EDGAR REPORTS

5. STANDARD RESEARCH AGREEMENTS
SCORE: 94%
LIST OF CONTRACTS AND AGREEMENTS FOR USE WITH SPONSORED PROJECTS

WHOIS | 411 | SEARCH BY: COMPANY, PARENT, INDUSTRY | SITE MAP | NEWS | JOBS | TRADEMARKS | 46e
BUSINESS REPORT | EDGAR REPORTS

6. INTELLECTUAL PROPERTY POLICY
SCORE: 93%
EXHIBIT B INCOME DISTRIBUTION TABLES THE UNIVERSITY OF MASSACHUSETTS THESE INCOME DISTRIBUTION TABLES WERE ESTABLISHED ON APRIL 22, 1996. PLEASE CHECK WITH THE VICE CHANCELLOR FOR RESEARCH OR THE CVIP TO ENSURE THAT THESE INCOME DISTRIBUTION TABLES.

WHOIS | 411 | SEARCH BY: COMPANY, PARENT, INDUSTRY | SITE MAP | NEWS | JOBS | TRADEMARKS | 46f
BUSINESS REPORT | EDGAR REPORTS

FIG. 4B

| FIG. 6A | FIG. 6B |

FIG. 6

Switchboard.

People | My Corner
Web Sites | Business

/ 68

Want your business seen on the Web?

New search | More listings

Computer & Equipment Dealers near Maynard, MA

72a { Mohawk Memory Co
16 Waltham St.
Maynard, MA 01754-2412
Phone: (978)897-1500
Distance: 0.12 mi.

72b { Digital Equipments Corporation
111 Powder Mill Rd
Maynard, MA 01754-1482
Phone: (508) 493-8918
Distance: 0.73 mi.  WWW 72c { Digital Equipments Corporation 74a
129 Parker Street
Maynard, MA 01754
Phone: null
Toll-Free Number : (800)344-4825
Distance: 1.02 mi.  WWW 72d { E M Assoc   74b  } 70
54 Knox Tri
Acton, MA 01720-5935
Phone: (978)461-0284
Distance: 1.30 mi.

72e { Peripheral Devices
34 School St
Acton, MA 01720-3626
Phone: (978)263-8900
Distance: 1.89 mi.  WWW
                              78

72f { Psion
10 Craig Rd
Acton, MA 01720-5405
Phone: (978)264-3100
Distance: 2.76 mi.

72g { Signal Computer Products
30 Domino Dr
Concord, MA 01742-2817
Phone (978)287-0800
Distance: 2.78 mi.

FIG. 6A

METHOD FOR SEARCH ENGINE GENERATING SUPPLEMENTED SEARCH NOT INCLUDED IN CONVENTIONAL SEARCH RESULT IDENTIFYING ENTITY DATA RELATED TO PORTION OF LOCATED WEB PAGE

CROSS-REFERENCE TO RELATED APPLICATIONS

This application claims the benefit of U.S. Provisional Application Serial No. 60/097,029 entitled "Collecting, Combining, Analyzing, and Using Internet and Business Information" filed on Aug. 17, 1998, which is incorporated herein.

BACKGROUND OF THE INVENTION

This application relates to enhancing computer-based searching.

Much of the information available on the World-Wide Web ("Web") is organized into Web pages that can be retrieved and displayed by Web browser software under the direction of a user. Each of the Web pages is identifiable by a respective Uniform Resource Locator text string ("URL"), such as "http://www.isp321.com/frontpage.html", that the Web browser software can use to select the page. Each URL includes a domain name, such as "www.isp321.com", that identifies the Web site where the corresponding Web page is stored for retrieval by Web browser software. Each domain name is registered by an entity that controls the corresponding Web site and Web pages. A domain name registry organization maintains the domain name registration information, which may include name, address, and other information that allows the organization to bill the entity for payment for the maintenance.

An Internet service provider ("ISP") is an example of an entity that may have a registered domain name for a Web site. Typically, an ISP has customers such as individuals or businesses for whom the ISP stores Web pages on the Web site for retrieval by Web browser software. For example, the ISP may have a customer Maple Street Plumbing for which the ISP stores a home Web page having a URL that includes a prefix "http://www.isp321.com/~maplestplumb". A home Web page is typically the only or the primary entry point into a Web site or a set of Web pages that are under the control of an entity.

Another example of an entity that may have a registered domain name is a Web portal site that maintains, in pages organized by categories, links to Web sites and home pages that are under the control of other entities. Typically, a Web portal site allows another entity to create a link from the Web portal site to the other entity's Web site or home page by submitting information to the Web portal site.

A Web search engine site maintains and updates a search engine database, i.e., a Web page record database, that includes a Web page record for every Web page that has been turned up by Web sweeping software that sweeps the World Wide Web for any and all Web pages. A typical Web page record includes a URL for the respective Web page, an excerpt or other subset of the information provided by the Web page, and a date indicating the most recent update of the Web page record When a user directs a Web search engine site to execute a search, the Web page record database is searched and then search engine results are displayed to the user in the form of a list of Web page records.

An on-line yellow pages site maintains and updates a yellow pages database that includes yellow pages entries having information similar to information found in entries in a traditional yellow pages book. When a user directs the yellow pages site to execute a search, the yellow pages database is searched and then yellow pages results are displayed to the user in the form of a list of yellow pages entries.

Some information about an entity may not be available on a Web site that is under the control of the entity. For example, public financial information about a company may be stored in a database that is not linked to the company's Web site or is not directly accessible by Web browser software, such as a database under the control of a financial services firm.

SUMMARY OF THE INVENTION

Methods, systems, and computer software are provided for enhancing computer-based searching. Such enhancements are made possible by a highly effective mapping database that allows different sets of information from different computerized sources to be mapped to each other to indicate that the different sets pertain to the same entity such as a business. In one or more aspects of the invention, it is determined that an entity is registered as having control over the use of at least a portion of a Web address, and computer data pertaining to the entity is acquired or used that includes information other than information provided at the Web address.

Different aspects of the invention allow one or more of the following. Search engine results can be provided that include little or no irrelevant information. A search engine application can serve as a user's primary entry point into a yellow pages engine application or a yellow pages engine application can serve as a user's primary entry point into a search engine application. A user can be provided with confirmation that a Web page purporting to be under the control of a particular entity is in fact under the control of that entity. An entity having control over multiple Web sites can allow a user to limit a single search to all of the entity's Web sites. An entity providing a search engine application or a yellow pages application can enhance the application, thus increasing the amount of attention a user devotes to the application and giving the entity more targeted information on the user's interests, which can result in increased advertising revenue for the entity.

Other features and advantages will become apparent from the following description, including the drawings, and from the claims.

BRIEF DESCRIPTION OF THE DRAWINGS

FIGS. 3, 4, and 6 are illustrations of output produced by software.

DETAILED DESCRIPTION

Figure 1:
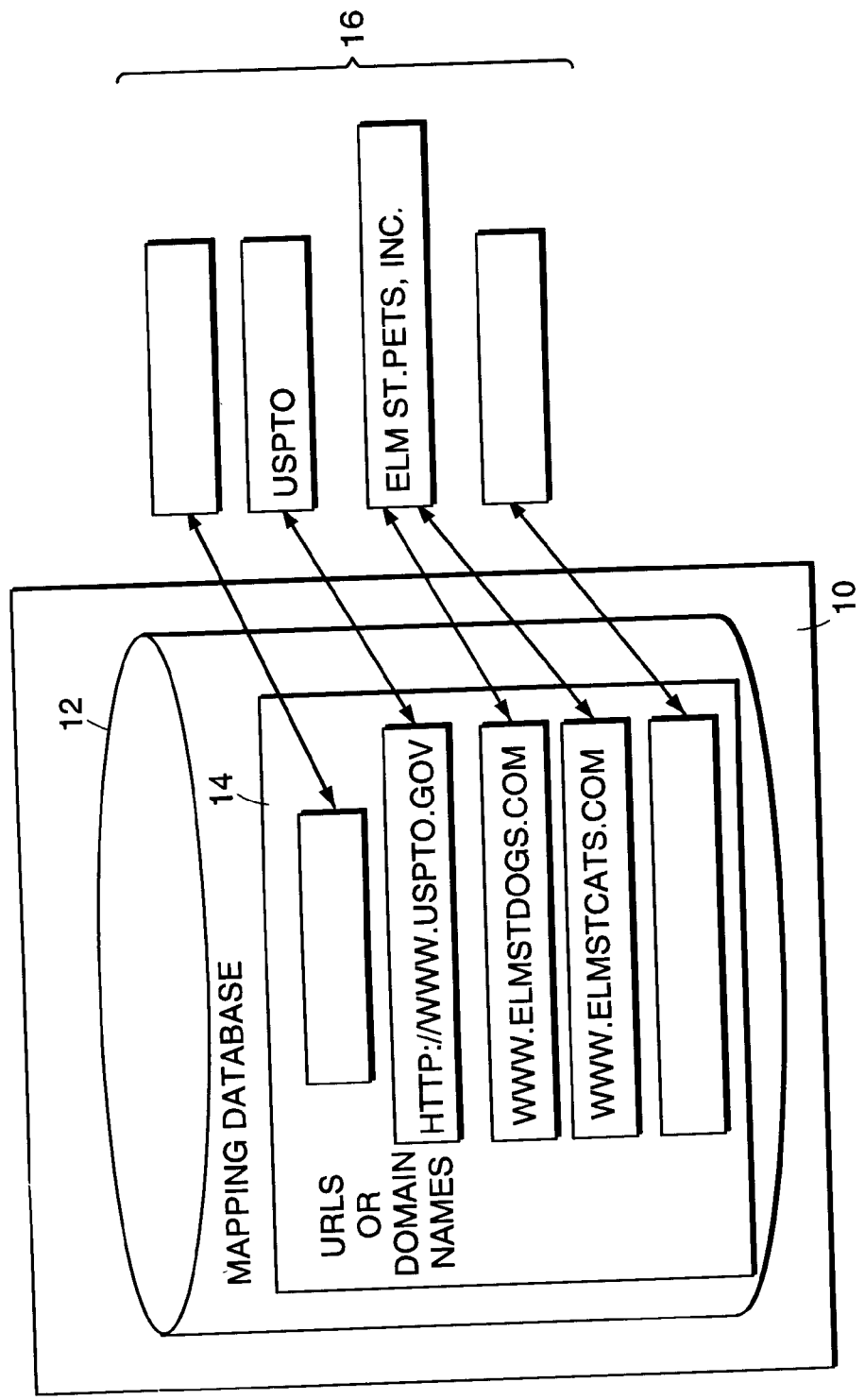
FIGS. 1, 2, 5, 7, and 13 are block diagrams of computer-based systems.

FIG. 1 illustrates a computer system 10 in which a mapping database 12 maps URLs or domain names 14 to entities 16 such as people, businesses, or government agencies, as described in more detail below. For example, the mapping database may indicate that any URL that begins with "http://www.uspto.gov" is for a Web page controlled by the U.S. Patent and Trademark Office, or that domain names "www.elmstdogs.com" and "www.elmstcats.com" are under the control of a company named Elm Street Pets, Inc.

Numerous applications, such as three examples described below, can take advantage of the mapping database. In a first application described below (FIGS. 2–3), a search of a search engine database is limited to records of Web pages that are under the control of a specified entity. Since Web page records have URLs that include domain names, the mapping database effectively maps Web page records to entities.

Figure 5:
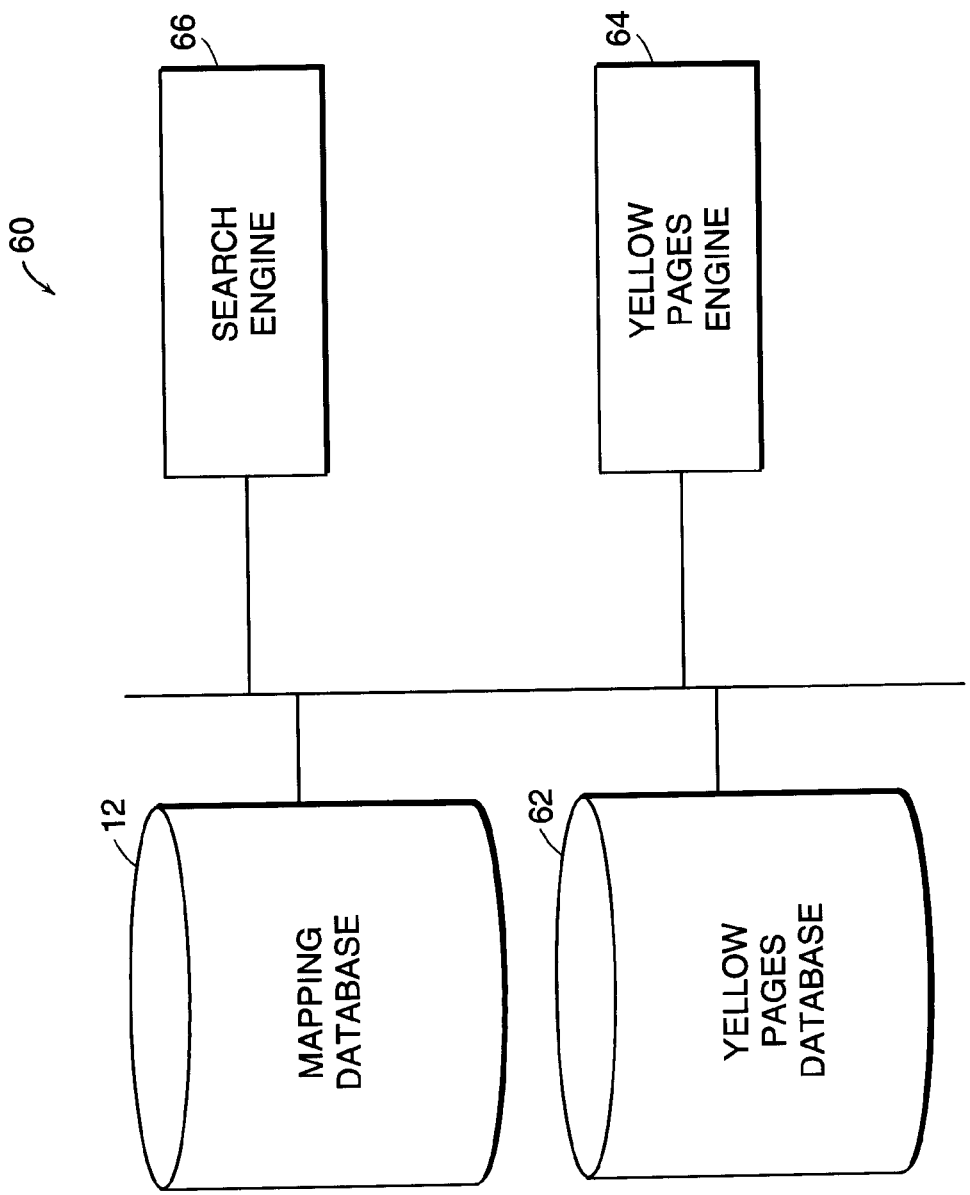
Figure 6B:

A second application described below (FIGS. 2, 4) specifies that the results of a search engine search are enhanced to include links to additional information about the entities that have control over the Web pages identified in the results. According to a third application described below (FIGS. 5–6), results of a yellow pages search include links to Web sites that are under the control of entities identified in the results, and links for executing a search that is limited to Web pages of such Web sites.

Figure 2:
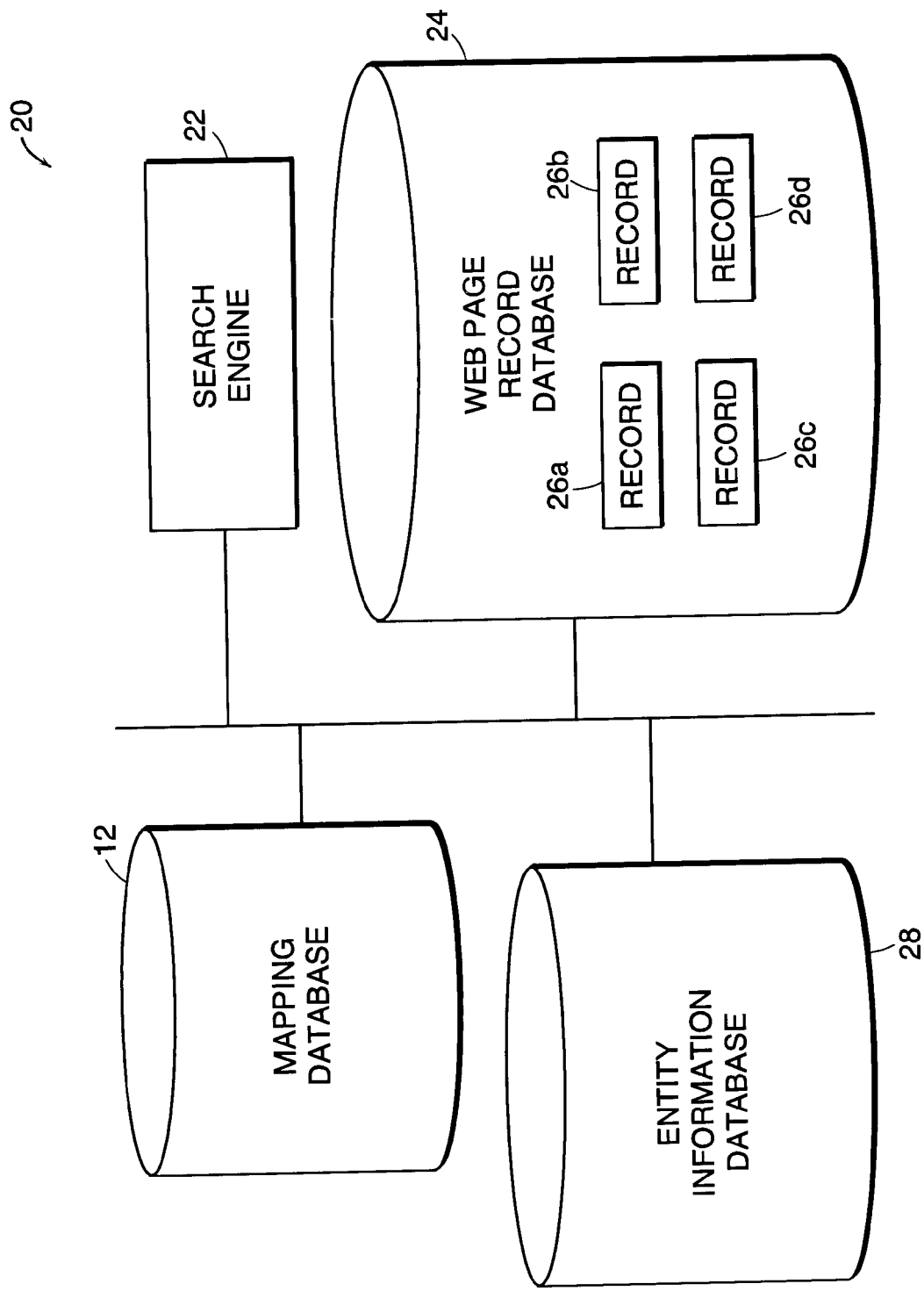
Figure 3:
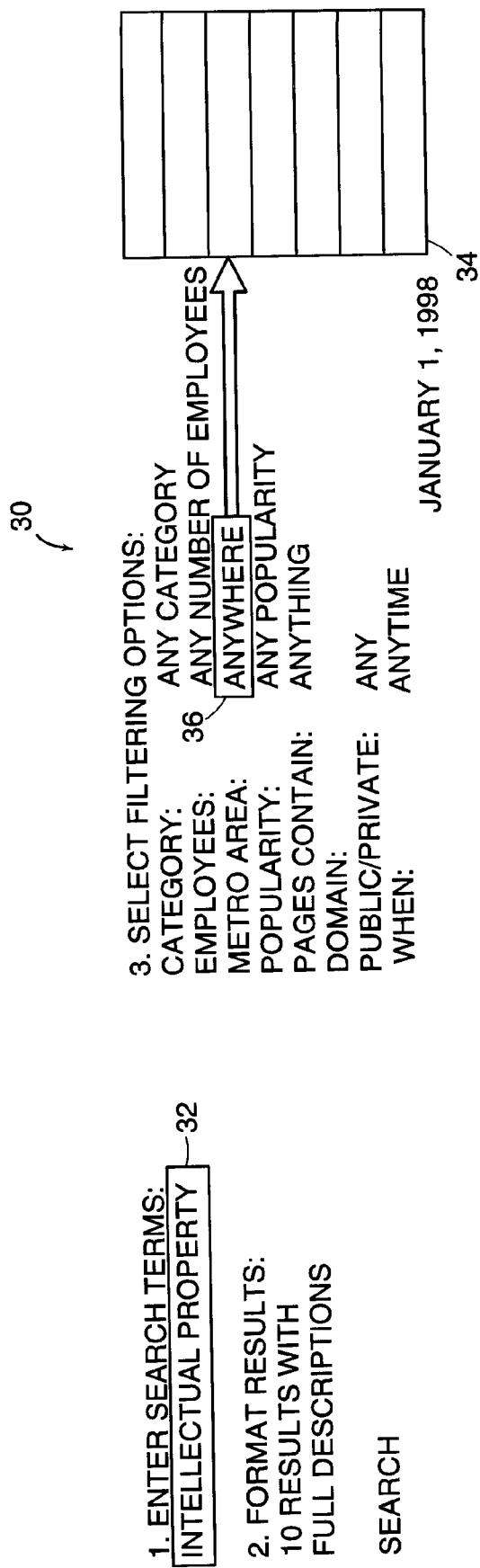

FIG. 2 illustrates a computer system 20 having the mapping database, a search engine 22, a Web page record database 24 that includes Web page records 26a–26d, and an entity information database 28 that includes information such as geographic information about entities to which URLs or domain names are mapped in the mapping database. In accordance with the first application referenced above, the search engine has a search specification page 30 (FIG. 3), by which a user of the search engine can specify search criteria. As described in more detail below, the search specification page allows the user not only to provide a search string, in a search string box 32, but also to limit the search to records of Web pages that are under the control of a specified entity or set of entities, such as entities having offices in a geographical area specified in a menu 34 made available by a menu button 36. The search can also be limited according to industry, size (e.g., number of employees), and attributes of the controlling entity (e.g., whether it is a publicly traded company, a company with a single location, or a government agency). For instance, a user can limit the search to information provided in Web pages that are under the control of automobile dealers in a particular state, or that are under the control of universities having more than 2,000 employees.

In accordance with the second application referenced above, the computer system 20 of FIG. 2 produces search results, such as search results 40 (FIG. 4) that include a list 42 of Web page references 44a–44f. In the search results, one or more Web page references are associated with respective sets of supplemental links 46a–46f. Each set of supplemental links is able to direct the user to information such as address and telephone number or public financial information about the entity to which the respective Web page is mapped in the mapping database. For example, if Web page reference 44e is for a Web page that is under the control of a public-traded company, supplemental links 48a and 48b may direct the user to a headquarters address and a stock quote for the company.

A computer system 60 (FIG. 5), used in accordance with the third application referenced above, includes the mapping database, a yellow pages database 62, a yellow pages engine 64, and a search engine 66. After the user specifies yellow pages search criteria, the yellow pages engine produces yellow pages results, such as results 68 (FIG. 6) that include a list 70 of yellow pages entries 72a–72g identifying entities such as companies and having Web site links 74a–74b and Web search links 76a–76e. (In a specific embodiment, the Web search links that are initially shown, here 76a–76e, are associated with the first yellow pages entry that has a Web site link, here entry 72b and link 74a.) Each set of Web site links is able to direct the user to one or more Web sites having Web pages that are mapped in the mapping database to the respective entity identified in the respective yellow pages entry. Each set of Web search links allows the user to execute a search of such Web sites. For example, if yellow pages entry 72e identifies a computer company that has a Web site, the user may be able to visit the computer company's Web site by selecting respective Web site link 78 and may be able to execute a search of the computer company's Web site by selecting a respective Web search link. Links 74a–74b may provide similar capabilities.

Figure 7:
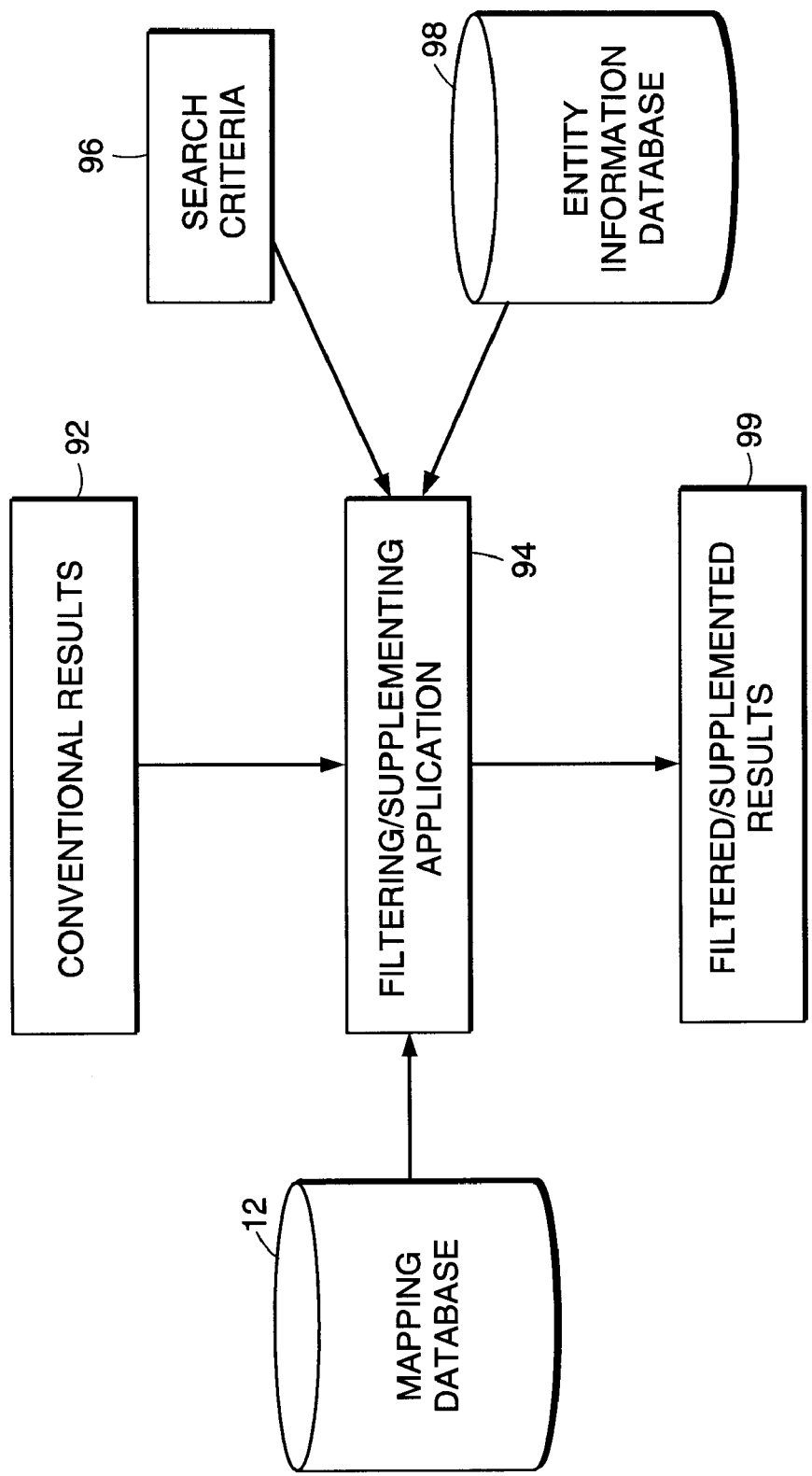
Figure 8:
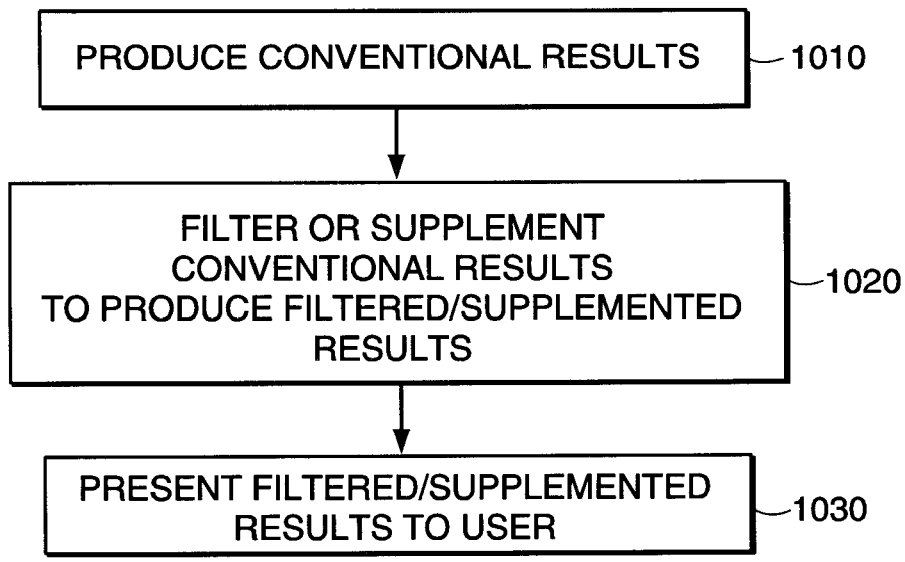
FIGS. 8–12 are flow diagrams of computer-based procedures.
Figure 9:
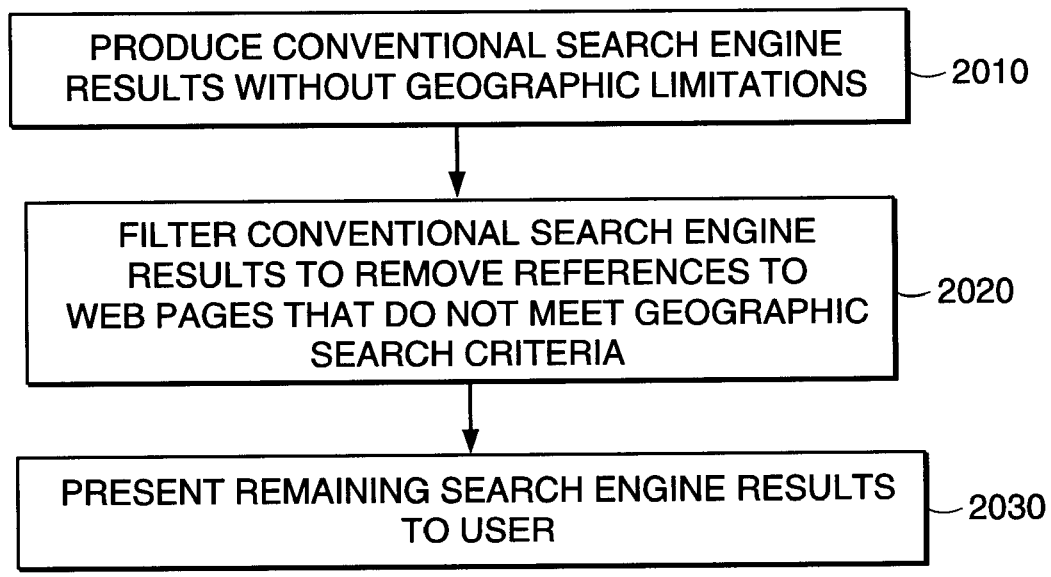

Applications that make use of the mapping database may take advantage of one or more of the following procedures. For example, the applications described above may rely on a filtering/supplementing procedure 90 (FIG. 8), now described, in which the mapping database is used to filter or supplement search engine or yellow pages results before such results are presented to the user. In the filtering/supplementing procedure, conventional search engine or yellow pages results 92 (FIG. 7) are produced (step 1010), the conventional results 92 are filtered or supplemented by a filtering/supplementing application 94 that refers to the mapping database 12 and to search criteria 96 supplied by the user and an entity information database 98 (both described below) as needed, to produce filtered/supplemented results 99 (step 1020), and the filtered/supplemented results are presented to the user (step 1030). Thus, for example (FIG. 9), if the user has set forth search criteria directing that a search engine search be limited to Web pages that are under the control of entities associated with a particular geographic area, conventional search engine results are produced without such geographic limitations (step 2010), information from the mapping database, and from the entity information database as needed, is used to filter the conventional search engine results to remove references to Web pages that do not meet the geographic search criteria (step 2020), and the remaining search engine results are then presented to the user (2030).

Figure 10:
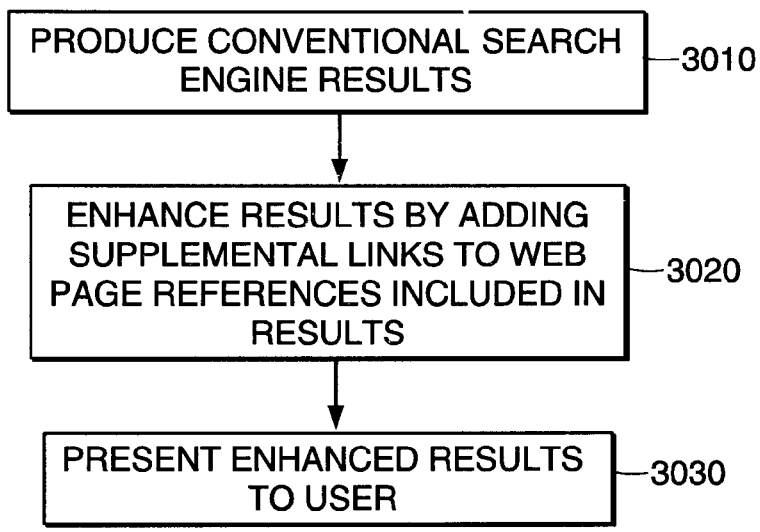
Figure 11:
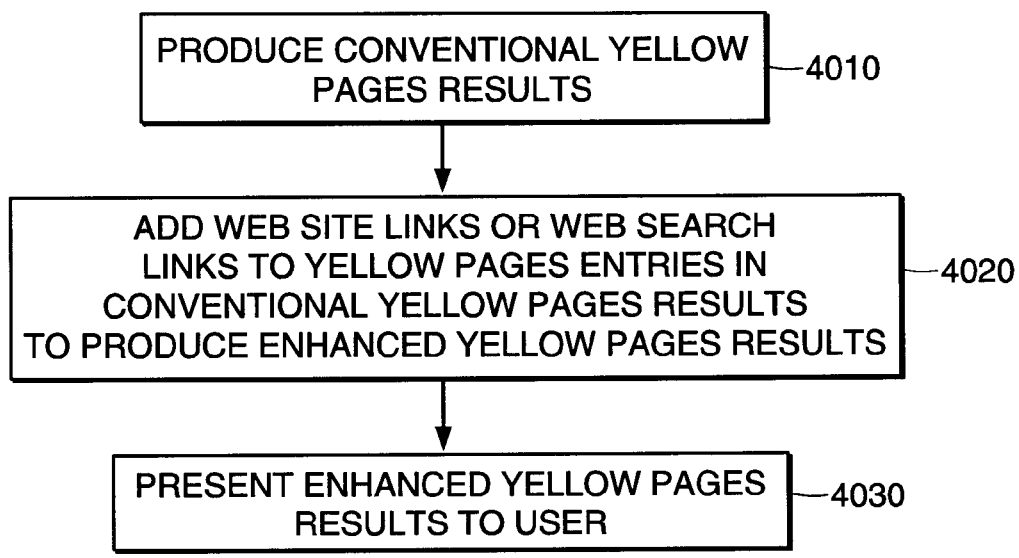

In another example (FIG. 10) of a use of the filtering/supplementing procedure, conventional search engine results are produced (step 3010), information from the mapping database, and from the entity information database as needed, is used to enhance the results by adding supplemental links to Web page references included in the results (step 3020), and the enhanced results are then presented to the user (step 3030). In an example (FIG. 11) concerning yellow pages results, conventional yellow pages results are produced (step 4010), information from the mapping database is used to add Web site links or Web search links to yellow pages entries in the conventional yellow pages results to produce enhanced yellow pages results (step 4020), and the enhanced yellow pages results are then presented to the user (step 4030).

Figure 12:
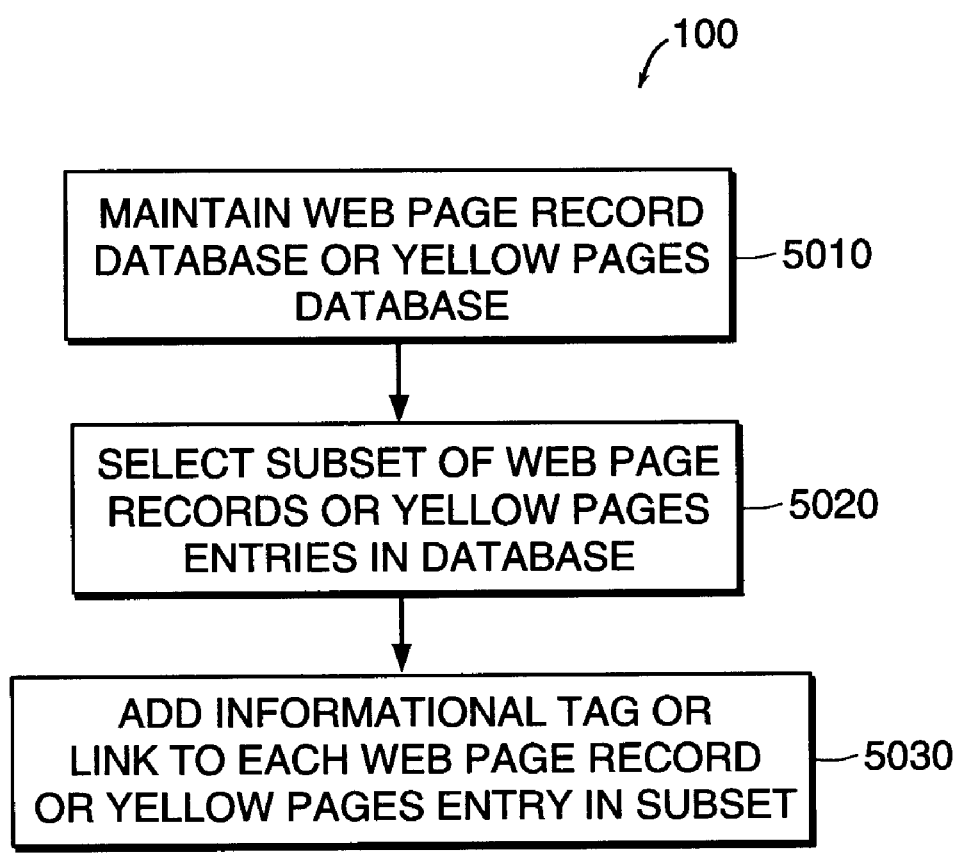
Figure 13:
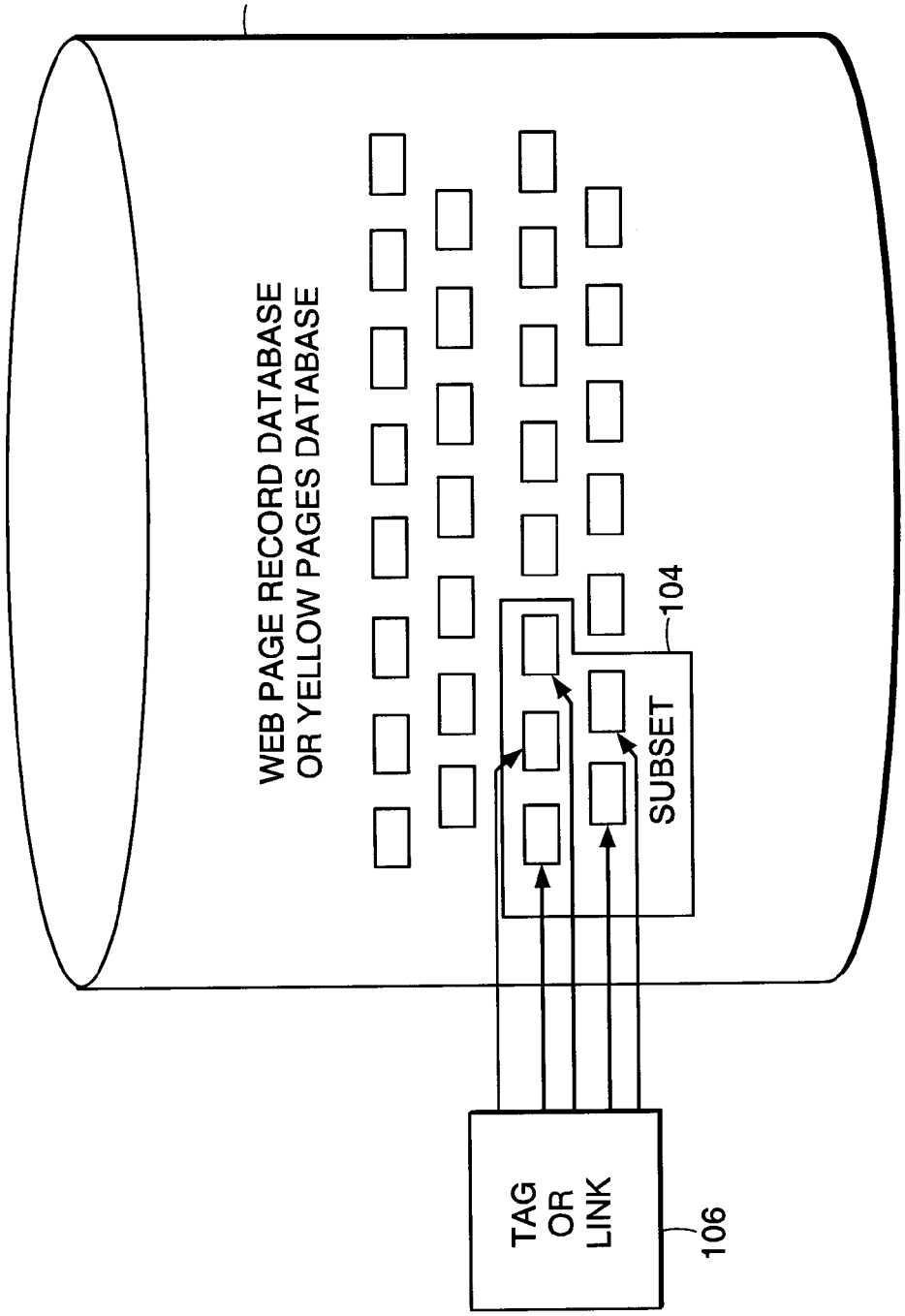

One or more of the applications described above may rely on a tagging procedure 100 (FIG. 12) described below, in which informational tags or links are added to or embedded in Web page records of a conventional Web page record database or to yellow pages entries of a conventional yellow pages database to produce an enhanced Web page record database or an enhanced yellow pages database. In the tagging procedure, a Web page record database or a yellow pages database 102 (FIG. 13) is maintained (step 5010), based on information in the mapping database 12, a subset 104 of the Web page records or yellow pages entries in the database 102 is selected (step 5020), and an informational tag or link 106 is added to each Web page record or yellow pages entry in the subset (step 5030). This allows for an additional block of controlling entity meta-data, such as a series of yes/no attributes or additional keywords with special meanings, to be attached to the Web page records. For example, if the Web page record database includes Web page records for Web pages that are under the control of entities based in many different locations, informational tags can be added to Web page records in the database to indicate geographical locations. In such a case, Web page records for Web pages that are under the control of entities present in a particular U.S. state may each be tagged with an informational tag that indicates the state. Thus, if a user limits a search by state, the search engine can refer to such informational tags to determine which Web page records to return in the search results.

In another example, business ID codes may be added to Web page records in the Web page record database so that when search engine results are produced, the user can follow the links to get address and telephone number information for the entities having control over the Web pages indicated in the results. In an example concerning the yellow pages database, links to entity Web home pages may be added to yellow pages entries so that when yellow pages results are produced, the user can follow the links to visit the Web home pages of the entities identified in the yellow pages results.

A system based on the tagging procedure may produce largely or exactly the same results produced by a system based on the filtering/supplementing procedure. The filtering/supplementing procedure makes possible applications such as the first, second, and third applications referenced above with few or no changes to a conventional search engine database. In addition, such applications are as up-to-date as the mapping database itself.

The tagging procedure allows applications such as the first, second, and third applications referenced above to be provided without incurring delays for interaction with the mapping database each time a search is executed. A Web page record database or a yellow pages database may be updated by the tagging procedure on a schedule such as daily or weekly, to take into account new information such as a change in the URL for an entity's Web home page or a new domain name that is under the control of an existing entity.

A variation of the tagging procedure allows informational tags or Web links to be added as Web page records or yellow pages entries are being added to or updated in the Web page record database or yellow pages database.

The mapping database may use a unique identification number ("unique ID"), such as a 9-digit American Business Information ("ABI") number, to identify an entity so that other information about the entity can be retrieved from the entity information database or elsewhere by searching under the unique ID. (ABI numbers are sponsored by infoUSA.) For example, prior to execution of the tagging procedure, unique IDs from the mapping database may be used to search the entity information database to produce a subset of the mapping database that has records only for entities having a particular characteristic, such as a particular geographic location or between 1000 and 5000 employees. In such a case, the subset may be used in the tagging procedure so that every Web page record that is referenced in the subset is given the same informational tag indicating the particular geographic location or number of employees category. Another subset of the mapping database that has records for entities having another particular characteristic may be produced and then used to give every Web page record referenced in the other subset an informational tag indicating the other particular characteristic.

Where an entity constitutes a portion of another entity, each of the entities may be assigned different unique IDs, and the different unique IDs may be linked in the mapping database to note the relationship among the entities. For example, a company that has offices in different locations may be assigned a unique ID for the company itself and a respective different unique ID for each location. In another example, when two previously unrelated companies merge or one is acquired by the other, each may retain its unique ID and a new, different unique ID may be assigned to the combination of the two companies, or both companies may be assigned the same unique ID. As a result, a user may be able to limit a search engine search to an entity and other entities that are related to the entity, and yellow pages results may be produced that include links to home pages for the entities identified in the results and for entities related to the identified entities. For example, if Elm Street Pets is a subsidiary of Maple Street Plumbing, a user may be able to limit a search engine search to Elm Street Pets and Maple Street Plumbing, or yellow pages results may be produced that identify Elm Street Pets and include links to the home pages of Elm Street Pets and Maple Street Plumbing.

A search engine search may be limited to Web pages under the control of an entity having a unique ID 1234, by adding a search phrase such as "and uniqueid=1234" to a conventional search phrase.

The tagging procedure may use one or more database commands to add informational tags or links to Web page records in the Web page record database. For example, each Web page record may have an SIC field for a standard industry code ("SIC") number that indicates the industry category for the entity to which the Web page record is mapped in the mapping database. In such a case, the tagging procedure may use a tagging file command such as:

URL: http://*.elmstcats.com:*/*
PROP: iasic1 73
PROP: iasic2 36
PROP: iasic3 03.

Such a command loads SIC number "733603" into the SIC field of every Web page record for every Web page in the domain "elmstcats.com".

Each SIC field may be arranged to hold a number having sections to indicate broad and narrow industry categories. For example, the SIC field may hold an SIC number having six digits, of which the first two digits may indicate a broad industry category such as "service companies", the second two digits may indicate "computer service companies" as a subcategory of "service companies", and the third two digits may indicate "manufacturer computer service companies" as a subcategory of "computer service companies". As a result, a user may choose to limit searches of the Web page record database by industry categories or subcategories represented by SIC numbers.

Informational tags may take the form of bit flags that may be arranged in sets of 8 or 64. The setting of each bit flag, alone or in combination with the settings of other bit flags, may indicate information such as geographical location (e.g., metropolitan area) or industry category.

Information in the mapping database may be derived from information submitted by or on behalf of the entity when a domain name is registered. For example, when the company Elm Street Pets, Inc. registers the domain names "www.elmstdogs.com" and "www.elmstcats.com" with a domain name registry, the company associates the domain names with at least enough information, such as name, address, and telephone number information, to allow the domain name registry to bill the company for maintenance of the registration.

The entity may submit information to the mapping database in other ways such as in an on-line questionnaire that feeds the mapping database.

Information in the mapping database may be derived from information provided by an intermediary such as an ISP or an Internet portal. For example, an ISP having a domain name "www.isp321.com" may have a customer Maple Street Plumbing for which the ISP hosts and administers a home page having a home page address "www.isp321.com/~maplestplumb". In such a case, the ISP may have name, address, and telephone number information for the purpose of billing Maple Street Plumbing for such hosting and administration, and may allow such information along with the home page address to be used to link the home page address to Maple Street Plumbing in the mapping database.

In another example, an Internet portal may allow an entity such as Maple Street Plumbing to create an entry or listing named "Maple Street Plumbing" in a "plumbing" section of a on-line directory maintained by the portal, to allow a user to view home page "www.isp321.com/~maplestplumb" by selecting the entry. In such a case, the Internet portal may allow information in the entry, and perhaps any address and telephone number information submitted by the entity during creation of the entry, to be used to link the home page to Maple Street Plumbing in the mapping database.

The mapping database and applications based on the mapping database may take advantage of a hierarchical organization of Web pages, by treating similarly a mapped page and all pages below the mapped page, such as pages sharing a particular prefix with the mapped page. For example, all pages sharing the prefix "www.isp321.com" may be treated as being under the control of an ISP named Global ISP Co. Since such pages include pages sharing the prefix "www.isp321.com/~maplestplumb", which should be treated as being under the control of Maple Street Plumbing, execution of a tagging procedure for Global ISP Co. should be followed by execution of a tagging procedure for Maple Street Plumbing so that tags referring to Global ISP Co. are changed to tags referring to Maple Street Plumbing where appropriate.

The mapping database may map an entity to Web pages maintained at different Web sites. For example, Maple Street Plumbing may have a first set of Web pages at the Global ISP Co. site and a second set of Web pages at another ISP's site. A tagging procedure to tag Web page records for all such pages as being under the control of Maple Street Plumbing may have two parts: a first part that tags Web page records for the first set and a second part that tags Web page records for the second set. Yellow pages entries may also be provided with Web links to both sets.

The entity information database may include a database such as EDGAR that includes information about companies, and a user may retrieve information from the entity information database by following a supplemental link as described above. Information derived from EDGAR may be used to allow a user to limit a search engine search to companies that match a specified financial profile, such as profitable companies.

If the search engine database keeps track of the number of Web pages outside a Web site that include links to the Web site or to a particular page at the Web site, such a number may be specified in the search specification page or included in an informational tag for each Web page record that corresponds to a Web page of the Web site. Web page records for Web pages created for one entity by another entity such as a public relations firm may be tagged with the unique IDs for both entities, so that the output of an entity can be tracked as well as the Web pages under the entity's control.

Information in the mapping database or the entity information database may allow searches to be limited by relative size of entities, such as size in an industry.

One or more of the databases referenced above may be or include a relational database and may have records to which fields may be added readily to accept informational tags and Web link information. Since different Web page record databases may be organized differently, procedures for adding fields to Web page records and for inserting information into the added fields may need to be tailored to specific databases.

Any of many different types of computer equipment may be used. For example, one or more Intel-based personal computers may be used that run an SQL database on Linux and that periodically produce tagging files that are passed to search engines to apply to their indices. In another example, standard search results are passed through the computer running Linux and a filtering program filters out results that do not match criteria determined by queries to the SQL database. In one embodiment, the program that creates the tagging files may be written in the Perl programming language and may be run weekly, and the filtering program may be written in Perl or the C programming language with interfaces to the SQL database.

The technique (i.e., the procedures described above) may be implemented in hardware or software, or a combination of both. In at least some cases, it is advantageous if the technique is implemented in computer programs executing on one or more programmable computers, such as a personal computer running or able to run an operating system such as Unix, Linux, Microsoft Windows 95, 98, or NT, or MacIntosh OS, that each include a processor, a storage medium readable by the processor (including volatile and non-volatile memory and/or storage elements), at least one input device such as a keyboard, and at least one output device. Program code is applied to data entered using the input device to perform the technique described above and to generate output information. The output information is applied to one or more output devices such as a display screen of the computer.

In at least some cases, it is advantageous if each program is implemented in a high level procedural or object-oriented programming language such as Perl, C, C++, or Java to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or optical or magnetic disc, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the user may be a human being or a non-human entity such as a computer program or an automated device that may interact with one or more of the databases or one or more of the applications via an application programming interface ("API") or a network message. An on-line information store or multiple databases may serve as the entity information database, which may take the form of any mechanism that provides automated access to information, such as a spreadsheet file or a store of email messages.

What is claimed is:

1. A method for performing a World-Wide Web search, comprising:

acquiring from a user a search request containing search criteria;

performing a conventional search based on said search criteria to obtain conventional search results containing at least one Web address of a located Web page;

determining at least one entity that is registered as having control over at least a portion of said located Web page; and generating supplemented search results based on said conventional search results, said at least one entity, and said search criteria; said supplemented search results including information not included in said conventional search results, where such information includes entity information, other than contact information, associated with said at least one entity.

2. The method of claim 1, wherein said performing further comprises:

searching a search engine database for Web pages associated with said search criteria; and obtaining said conventional search results.

3. The method of claim 1, wherein said determining comprises:

searching an entity information database for said at least one entity that is registered as having control over said Web address; and obtaining said at least one entity.

4. The method of claim 3, wherein said searching further comprises searching a domain name registry for said at least one entity that is the registrant of a domain name contained within said at least one Web address.

5. The method of claim 1, further comprising, before said acquiring, ascertaining which at least one entity is registered as having control over at least a portion of a Web page associated with a Web address; and associating said at least one entity with said Web address in a search engine database.

6. The method of claim 5, wherein said performing further comprises searching said search engine database to obtain said conventional search results.

7. The method of claim 6, wherein said determining further comprises mapping said at least one Web address of said located Web page to at least one entity that is registered as having control over at least a portion of said located Web page.

8. The method of claim 1 wherein said supplementing further comprises adding other information about said at least one entity to said conventional search results, where said other information includes information not provided in said conventional search results.

9. The method of claim 1, wherein said determining further comprises mapping said at least one Web address of said located Web page to at least one entity that is registered as having control over at least a portion of said located Web page.

10. The method of claim 9, wherein said determining further comprises searching an entity information database to obtain other information about said at least one entity, where said other information includes information not provided in said conventional search results.

11. The method of claim 1, wherein said other information is derived from billing information supplied by said at least one entity.

12. The method of claim 1, further comprising presenting said supplemented search results to said user.

13. The method of claim 1, wherein said generating comprises filtering said conventional search results based on said at least one entity and said search criteria to produce a reduced set of search results.

14. The method of claim 13, wherein said filtering is based on a characteristic of said at least one entity selected from a group consisting of geographic location, industry category, industry subcategory, organizational size, type of entity, financial characteristics of said entity, and any combination of the aforementioned.

15. The method of claim 1, wherein said entity information includes a link to public financial information about said at least one entity.

16. The method of claim 1, wherein said entity information includes a link to a stock quote for said at least one entity.

17. A method for performing a World-Wide Web search, comprising:

acquiring from a user a search request containing search criteria;

performing a conventional search based on said search criteria to obtain conventional search results containing at least one Web address of a located Web page;

determining at least one entity that is registered as having control over at least a portion of said located Web page; and filtering said conventional search results based on said at least one entity and said search criteria to produce a reduced set of search results.

18. The method of claim 17, wherein said filtering is based on a characteristic of said at least one entity selected from a group consisting of: location, industry category, industry subcategory, size, and any combination of the aforementioned.

19. The method of claim 18, further comprising presenting said reduced set of search results to said user.

20. A method for performing a World-Wide Web search, comprising:

acquiring from a user a search request containing search criteria;

searching a search engine database for Web pages associated with said search criteria; and obtaining conventional search results containing at least one Web address of a located Web page;

searching a domain name registry for at least one entity that is the registrant of a domain name contained within said at least one Web address; and generating supplemented search results based on said conventional search results, said at least one entity, and said search criteria, where such supplemented search results include entity information, other than contact information, associated with said at least one entity.

21. The method of claim 20, further comprising presenting said supplemented search results to said user.

22. The method of claim 20, wherein said generating comprises filtering said conventional search results based on said at least one entity and said search criteria to produce a reduced set of search results.

23. The method of claim 22, wherein said filtering is based on a characteristic of said at least one entity selected from a group consisting of; geographic location, industry category, industry subcategory, organizational size, type of entity, financial characteristics of said entity, and any combination of the aforementioned.

24. The method of claim 20, wherein said entity information includes a link to public financial information about said at least one entity.

25. The method of claim 20, wherein said entity information includes a link to a stock quote for said at least one entity.

26. A method for performing a World-Wide Web search, comprising:

acquiring from a user a search request containing search criteria;

performing a conventional search based on said search criteria to obtain conventional search results containing at least one Web address of a located Web page;

searching a mapping database to determine at least one entity that is registered as having control over at least a portion of said located Web page;

searching an entity information database to locate entity information associated with said at least one entity; and generating supplemented search results based on said conventional search results, said entity information, said at least one entity, and said search criteria.

* * * * *